United States Patent [19]

Katsuda et al.

[11] 3,821,260

[45] June 28, 1974

[54] CERTAIN 5-ALKYLNYL-2-FURYLMETHYL ESTERS OF 2,2,3,3-TETRAMETHYL CYCLOPROPANE CARBOXYLIC ACID

[75] Inventors: Yoshio Katsuda, Osaka; Takashi Ohno, Takarazuka-shi, both of Japan

[73] Assignees: Sumitomo Chemical Company, Ltd., Osaka, Japan; Dainippon Jochugiku Co., Ltd., Osaka, Japan; an equal share to each

[22] Filed: Jan. 10, 1969

[21] Appl. No.: 790,447

[30] Foreign Application Priority Data

Jan. 16, 1968  Japan.................................. 43-2486
June 3, 1968  Japan................................ 43-38155
July 2, 1968  Japan................................ 43-46361

[52] U.S. Cl.............................. 260/347.4, 424/285
[51] Int. Cl................................................ C07d 5/16
[58] Field of Search.................................. 260/347.4

[56] References Cited
UNITED STATES PATENTS

| | | | |
|---|---|---|---|
| 3,465,007 | 9/1969 | Elliot | 260/347.8 |
| 3,567,740 | 3/1970 | Matsuii et al. | 260/346.2 |

OTHER PUBLICATIONS

Matsui et al., Chemical Abstracts (1969) Vol. 70, p. 77,432.

*Primary Examiner*—Henry R. Jiles
*Assistant Examiner*—Bernard Dentz
*Attorney, Agent, or Firm*—Stevens, Davis, Miller and Mosher

[57] ABSTRACT

5-Lower alkynyl-furylmethyl 2,2,3,3-tetramethyl-cyclopropane-1-carboxylates, which are harmless to mammals and inexpensive, and insecticidal compositions containing the same. The said carboxylates are prepared by the esterification of 5-lower alkynyl-furylmethyl alcohols or reactive derivatives thereof with 2,2,3,3-tetramethyl-cyclopropane-1-carboxylic acid or reactive derivatives thereof.

8 Claims, No Drawings

CERTAIN 5-ALKYLNYL-2-FURYLMETHYL ESTERS OF 2,2,3,3-TETRAMETHYL CYCLOPROPANE CARBOXYLIC ACID

DISCLOSURE OF THE INVENTION

The present invention pertains to novel 5-alkynyl-furylmethyl 2,2,3,3-tetramethylcyclopropane-1-carboxylates, processes for the preparation thereof and insecticidal compositions containing the same.

As insecticides among those which are actually used at present, pyrethroid-type insecticides are most useful in that they are harmless to mammals and are quick acting. Conventional pyrethroids, however, are not always inexpensive and hence are restricted in uses, and the advent of inexpensive pyrethroids has been strongly desired.

With an aim to satisfy the above desire, the present inventors made various studies to discover novel insecticidal compounds having strong activities.

It is therefore an object of the present invention to provide novel insecticidal compounds which are harmless to mammals and are inexpensive.

Another object of the invention is to provide insecticidal compositions containing said novel insecticidal compounds as active ingredients.

Other objects will be apparent from the following description.

In accordance with the present invention, there are provided novel cyclopropanecarboxylates represented by the formula

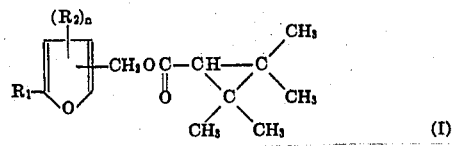

(I)

wherein $R_1$ represents a lower alkynyl group; $R_2$ represents a methyl group, a methoxy group or a halogen atom; and $n$ represents zero or an integer of 1 or 2. The cyclopropanecarboxylates of the formula (I) are prepared by esterifying a reactive furan derivative represented by the formula

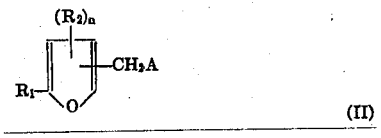

(II)

wherein A represents a hydroxyl group, a halogen atom or a reactive group such as tosyloxy group; and $R_1$, $R_2$ and $n$ are as defined above, with 2,2,3,3-tetramethylcyclopropane-1-carboxylic acid or a reactive derivative thereof, if necessary in the presence of a suitable reaction assistant.

The substituent A in the formula (II) representing the reactant furan derivative is selected, with an aim to accomplish the esterification within the scope of the present invention, according to the form of the other reactant 2,2,3,3-tetramethylcyclopropane-1-carboxylic acid or a reactive derivative thereof. Such selection is a self-evident technique for those skilled in the art. The reactive derivative referred to herein is an acid halide, an acid anhydride, a lower alkyl ester or a salt.

The process for preparing the novel cyclopropanecarboxylates of the formula (I) in accordance with the present invention will be described in further detail hereunder.

That is, the process of the present invention may be divided into the three cases illustrated below. i. The first is the case where A in the formula (II) is a hydroxyl group, i.e. the case where a lower alkynylsubstituted furylmethyl alcohol represented by the formula

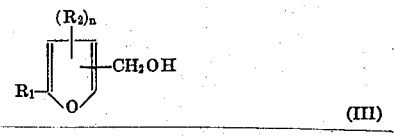

(III)

wherein $R_1$, $R_2$ and $n$ are as defined above, is used and is reacted with 2,2,3,3-tetramethylcyclopropane-1-carboxylic acid or its acid halide, acid anhydride or lower alkyl ester, to obtain an ester of the formula (I). When the said carboxylic acid itself is employed, the reaction is carried out under dehydration reaction conditions. That is, an alcohol of the formula (III) and 2,2,3,3-tetramethylcyclopropane-1-carboxylic acid are heated in the presence of an acid catalyst, such as a mineral acid or p-toluenesulfonic acid and an azeotropic solvent such as benzene or toluene, whereby an ester represented by the formula (I) is obtained. Alternatively, the above object can successfully be attained also by treating corresponding alcohol and carboxylic acid at room temperature or an elevated temperature in an inert solvent such as benzene or petroleum ether in the presence of a dehydrating agent such as dicyclohexylcarbodiimide.

When a halide of said acid is used, the reaction can be sufficiently effected at room temperature under dehydrohalogenation conditions in the presence of an organic tertiary base such as pyridine or triethylamine. As the acid halide in the above case, there may be used any halide so far as it is within the scope of the present invention. Ordinarily, however, acid chloride is used. In the reaction, the use of solvent is not indispensable, but the reaction is preferably effected in an inert solvent such as benzene, toluene or petroleum benzine in order to proceed the reaction smoothly.

When an anhydride of said acid is used, no reaction assistant is required, and the acid anhydride reacts at room temperature with an alcohol of the formula (III) to give a desired ester of the formula (I). In this case, the employment of an elevated temperature is effective for the promotion of reaction and that of an inert solvent is effective for the smooth progress of reaction, though these are not indispensable.

When a lower alkyl ester of said acid is used, the reaction is effected under ester exchange reaction conditions at an elevated temperature in the presence of a basic catalyst such as metallic sodium. In this case, the use of an inert solvent such as benzene or toluene is desirable for the smooth progress of the reaction. Preferable as the lower alkyl ester employed in the above case is methyl ester, ethyl ester, n-propyl ester, isopropyl ester or n-butyl ester. ii. The second of the present process is the case where A in the formula (II) is a halogen atom, i.e. the case where a lower alkynyl-substituted furylmethyl halide represented by the formula

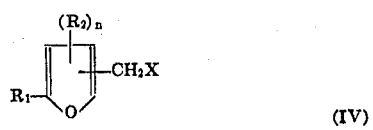

(IV)

wherein X represents a halogen atom; and $R_1$, $R_2$ and $n$ are as defined above, is used to obtain an ester of the formula (I). In this case, the other reactant, i.e., a reactive derivative of 2,2,3,3-tetramethylcyclopropane-1-carboxylic acid, is used in the form of a salt of an alkali metal or of an organic tertiary base, or a base capable of forming said salt at the time of reaction may be added simultaneously with the carboxylic acid. In the above case, it is desirable for the practice of the reaction that an inert solvent such as benzene or acetone be used, and the reaction be carried out at or below the boiling point of said solvent. Preferable as X in the formula (IV) is a chlorine or bromine atom, in general, but other halogen may optionally be used, as well. Further, preferable as the alkali metal salt in the above case is a sodium or potassium salt, and preferable as the organic tertiary base is pyridine, triethylamine or diethylaniline. iii. The third of the present process is the case where A in the formula (II) represents a tosyloxy group, i.e., the case where a lower alkynyl-substituted furylmethyl tosylate represented by the formula

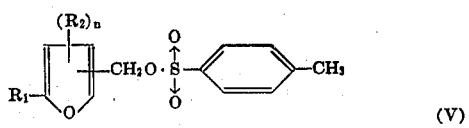

(V)

wherein $R_1$, $R_2$ and $n$ are as defined above, is used to obtain an ester of the formula (V). In this case, the other reactant and reaction conditions are entirely the same as in the second case of the present process.

Typical examples of the lower alkynyl group represented by $R_1$ in each of the above-mentioned general formulas are ethynyl, propargyl, 3-butynyl, 2-butynyl, 4-pentynyl and 2-pentynyl groups. Further, the halogen atom represented by $R_2$ in each of the aforesaid formulas may be any of chlorine, bromine, iodine and fluorine atoms. Generally, however, it is advantageous to use a chlorine atom, which is inexpensive and can be easily introduced. Halogen atoms and methyl and methoxy groups, which are represented by $R_2$, may individually occupy two or less vacant positions of the furan ring. However, these exemplifications do not limit the scope of the present invention.

The alkynyl substituted furyl methyl alcohols represented by the aforesaid general formula (III), which are used in the present process, are synthesized according to, for example, the method disclosed on page 13,209 of "Chemical Abstracts," Vol. 63, which method is concerned with the case of 5-propargyl furfuryl alcohol. Alternatively, they can be easily synthesized by the reduction of corresponding carboxylates. The furylmethyl halides represented by the formula (IV) can be readily obtained by halogenating corresponding alcohols with thionyl or phosphorus halides. Further, the furylmethyl tosylates represented by the formula (V) can be synthesized according to ordinary procedures from furylmethyl tosylate derivatives.

On the other hand, the other reactants, i.e., the 2,2,3-,3-tetramethylcyclopropane-1-carboxylic acids, can be simply synthesized from corresponding esters, according to, for example, the method set forth on page 24,436 of "Chemical Abstracts," Vol. 54. If necessary, these carboxylates may be converted, by ordinary procedures, to acid halides, acid anhydrides or salts.

All the cyclopropanecarboxylates of the formula (I), which are provided in accordance with the present invention, are novel compounds and have prominent knock-down and insecticidal activities on such injurious insects as houseflies, mosquitoes and cockroaches. Moreover, the compounds are usable without taking into consideration any injury towards mammals, and have wide uses particularly for prevention of epidemics. Further, they are extremely useful also for the control of insects injurious to stored cereals, agriculture and forestry.

Particularly useful compounds for the purpose of the present invention are as shown below, but compounds usable in the present invention are, of course, not limited only to these.

(1)

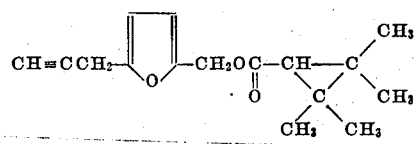

5-Propargyl-2-furylmethyl 2,2,3,3-tetramethylcyclopropane-1-carboxylate.

(2)

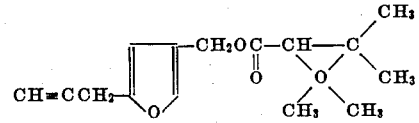

5-Propargyl-3-furylmethyl 2,2,3,3-tetramethylcyclopropane-1-carboxylate.

(3)

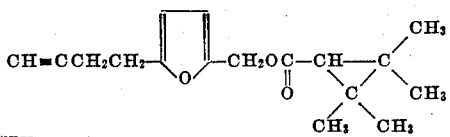

5-(3-Butynyl)-2-furylmethyl 2,2,3,3-tetramethylcyclopropane-1-carboxylate.

(4)

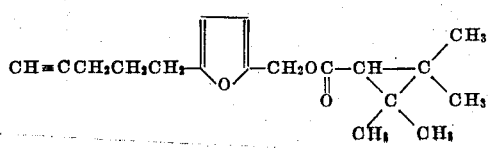

5-(4-Pentynyl)-2-furylmethyl 2,2,3,3-tetramethylcyclopropane-1-carboxylate.

(5) 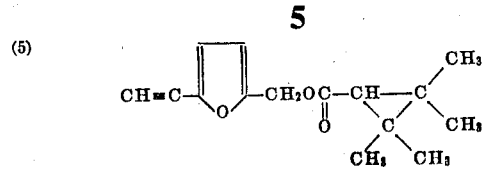

5-Ethynyl-2-furylmethyl 2,2,3,3-tetramethylcyclopropane-1-carboxylate.

(6) 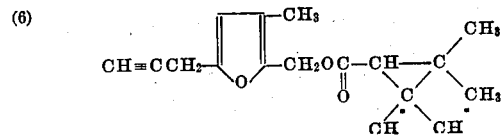

3-Methyl-5-propargyl-2-furylmethyl 2,2,3,3-tetramethylcyclopropane-1-carboxylate.

(7) 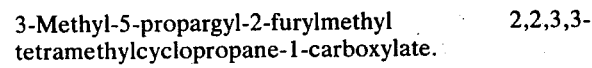

4-Methyl-5-propargyl-2-furylmethyl 2,2,3,3-tetramethylcyclopropane-1-carboxylate.

(8) 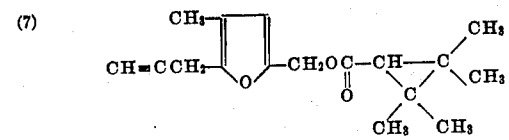

2-Methyl-5-propargyl-3-furylmethyl 2,2,3,3-tetramethylcyclopropane-1-carboxylate.

(9) 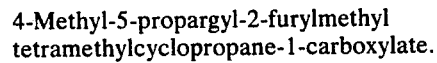

4-Methoxy-5-propargyl-2-furylmethyl 2,2,3,3-

(10) 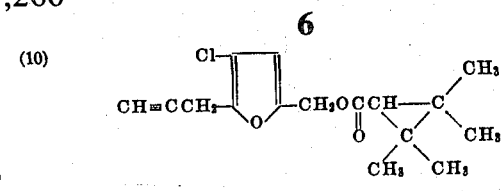

4-Chloro-5-propargyl-2-furylmethyl 2,2,3,3-tetramethylcyclopropane-1-carboxylate.

(11) 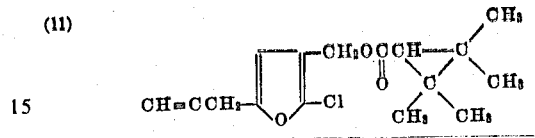

2-Chloro-5-propargyl-3-furylmethyl 2,2,3,3-tetramethylcyclopropane-1-carboxylate.

(12) 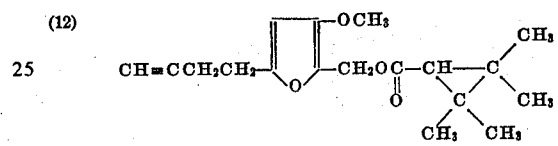

3-Methoxy-5-(3-butynyl)-2-furylmethyl 2,2,3,3-tetramethylcyclopropane-1-carboxylate.

(13) 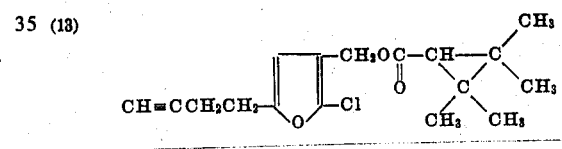

2-Chloro-5-(3-butynyl)-3-furylmethyl 2,2,3,3-tetramethylcyclopropane-1-carboxylate.

(14) 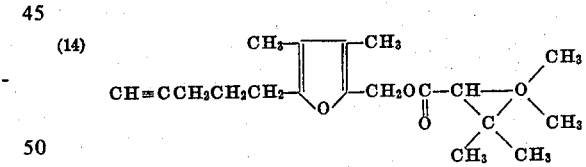

3,4-Dimethyl-5-(4-pentynyl)-2-furylmethyl 2,2,3,3-tetramethylcyclopropane-1-carboxylate.

(15) 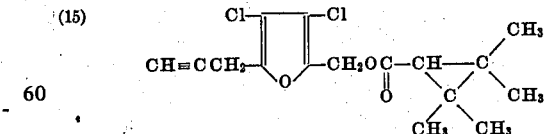

3,4-Dichloro-5-propargyl-2-furylmethyl 2,2,3,3-tetramethylcyclopropane-1-carboxylate.

In preparing insecticidal compositions containing as active ingredients the novel compounds provided in accordance with the present invention, it is sometimes preferable, depending on the objects of application of the insecticidal compositions, that the compounds are used after dissolving in an organic solvent such as xylene or methylnaphthalene. However, they can be processed, using diluents for common insecticides, into any forms of oil sprays, emulsifiable concentrates, wettable powders, dusts, aerosols, mosquito coils, fumigants and baits as occasion demands, according to ordinary procedures as adopted in the case of pyrethrum extracts and allethrin. Further, the compounds may be enhanced in activities by using in admixture with such synergistic agents as piperonyl butoxide and sulfoxide, or by adding, particularly in using them as mosquito coils, such known additives as terephthalic and isophthalic acids.

In addition, it is also possible to prepare compounded multi-purpose compositions by mixing the present compounds with other physiologically active ingredients, e.g. pyrethroid-type insetticides such as pyrethrum extracts, allethrin and phthalthrin, organochlorine-type insecticides and organophosphorus-type insecticides.

The present process is illustrated below with reference to examples.

The present compounds of the formula (I), including those exemplified previously, are successfully prepared according to the following standard operational methods:

A. Method according to the reaction of alcohol with carboxylic acid halide:

0.05 Mole of the furfuryl alcohol of the formula (III) is dissolved in 3 times the volume of said alcohol of dry benzene. To the solution is added 0.075 mole of pyridine. On the other hand, 0.053 mole of cyclopropanecarboxylic acid chloride, which is the other reactant, is dissolved in three times the volume of said chloride of dry benzene. The resulting solution is added at one time to the previously prepared solution, whereby an exothermic reaction takes place. After allowing to stand overnight in a tightly closed state, the reaction liquid is charged with a small amount of water to dissolve deposited hydrochloride, and then the aqueous layer is separated. Subsequently, the organic layer is washed with a 5 percent aqueous hydrochloric acid solution, an aqueous saturated sodium hydrogencarbonate solution and an aqueous saturated sodium chloride solution in this order and is dried with anhydrous sodium sulfate. Thereafter, benzene is removed by distillation, and the residual liquid is purified according to silica gel chromatography to obtain a desired product in the form of a pale yellow oil.

B. Method according to the dehydration reaction of alcohol with carboxylic acid:

Each 0.05 mole of the alcohol of the formula (III) and the cyclopropanecarboxylic acid are individually dissolved in three times the volume thereof of benzene, and the resulting solutions are mixed together. The mixed solution is allowed to stand overnight in a tightly closed state and is refluxed for 2 hours on the next day to complete the reaction. Thereafter, the same aftertreatments as in the standard operational method are effected to obtain a desired product.

C. Method according to the reaction of alcohol with carboxylic acid anhydride:

0.05 Mole of the alcohol of the formula (III) is dissolved in three times the volume of said alcohol of toluene. The solution is charged with 0.06 mole of a cyclopropanecarboxylic acid anhydride (synthesized from the carboxylic acid and an acetic anhydride), and the mixture is reacted at 100° C., for 3 hours. After cooling to below 10° C., the reaction liquid is neutralized by addition of a 10 percent aqueous sodium hydroxide solution, and excess acid anhydride and a carboxylic acid formed by the reaction are recovered as sodium salts. Thereafter, the organic layer is subjected to the same after-treatments as in the standard operational method A to obtain a desired ester.

D. Method according to the ester exchange reaction of alcohol with lower alkyl ester of carboxylic acid:

A mixture of 0.05 mole of the alcohol of the formula (III) and 0.06 mole of an ethyl ester of the cyclopropanecarboxylic acid is dissolved in five times the volume of said mixture of dry toluene. The solution is charged with 2 g. of fine particles of sodium metal and is refluxed under thorough stirring for 10 hours to complete the reaction. Subsequently, the reaction liquid is separated into layers by careful addition of cold water. Thereafter, the same after-treatments as in the standard operational method A are effected to obtain a desired product.

E. Method according to the reaction of methyl furan halide of the formula (IV) with cyclopropanecarboxylic acid:

A mixture of 0.05 mole of the methyl furan halide of the formula (IV) and 0.06 mole of the cyclopropanecarboxylic acid is dissolved in three times the volume of said mixture of acetone, and the solution is maintained at 15°–20° C. To the solution is then added drop by drop under stirring over a period of 1 hour a solution of 0.08 mole of triethylamine in three times the volume of said triethylamine of acetone. Thereafter, the reaction liquid is refluxed for 2 hours to complete the reaction. After cooling the reaction liquid, a deposited triethylamine hydrochloride is separated by filtration. From the filtrate, acetone is removed by distillation. The residual liquid is charged with three times the volume of said liquid of acetone, and is then subjected to the same aftertreatments as in the standard operational method A to obtain a desired ester.

F. Method according to the reaction of tosylate of alcohol with carboxylic acid salt:

0.05 Mole of the furylmethyl tosylate of the formula (V) is dissolved in three times the volume of said tosylate of acetone. To the solution is added at room temperature under thorough stirring over a period of 30 minutes 0.06 mole of sodium cyclopropanecarboxylate (synthesized by reacting the carboxylic acid with an equimolar amount of sodium hydroxide and then removing water by distillation). Thereafter, the reaction mixture is refluxed for 30 minutes to complete the reaction. After cooling the reaction liquid, a deposited solid is separated by filtration, and acetone is removed from the filtrate by distillation. The residue is dissolved in 3 times the volume of said residue of benzene, and then the solution is subjected to the same after-treatments as in the standard operational method A to obtain a desired product.

According to the above-mentioned standard operational methods, Examples 1–7 were effected to obtain the results as shown in Table 1.

Table 1

| Ex. No. | Furan derivative | Form of 2, 2, 3, 3-tetramethyl-cyclopropane-1-carboxylic acid | Reaction method | Cyclopropane carboxylate produced | | | |
|---|---|---|---|---|---|---|---|
| | | | | Yield (%) | Refractive Index ($n_D^{25}$) | Elementary analysis (%) | |
| 1 | 5-Propargyl-2-furyl-methyl alcohol | acid chloride | A | 94 | 1.4940 | Found: 73.6  7.21<br>Calc.: 73.8  7.07 | (for $C_{16}H_{20}O_3$) |
| 2 | do. | acid | B | 87 | 1.4942 | Found: 74.2  7.15<br>Calc.: 73.8  7.07 | (for $C_{16}H_{20}O_3$) |
| 3 | 5-Propargyl bromide | acid | E | 90 | 1.4940 | Found: 73.5  7.14<br>Calc.: 73.8  7.07 | (for $C_{16}H_{20}O_3$) |
| 4 | 5-Propargyl-3-furyl-methyl alcohol | anhydride | C | 92 | 1.4900 | Found: 73.3  7.08<br>Calc.: 73.8  7.07 | (for $C_{16}H_{20}O_3$) |
| 5 | 5-(3-Butynyl)-2-furylmethyl alcohol | Ethyl ester | D | 83 | 1.4755 | Found: 74.4  8.18<br>Calc.: 74.5  8.03 | (for $C_{17}H_{22}O_3$) |
| 6 | 5-(4-Pentynyl)-2-furylmethyl alcohol | acid chloride | A | 95 | 1.4570 | Found: 74.9  8.42<br>Calc.: 75.0  8.33 | (for $C_{18}H_{24}O_3$) |
| 7 | 5-Ethynyl-2-furyl-methyl tosylate | Sodium salt | F | 85 | 1.5130 | Found: 72.8  7.39<br>Calc.: 73.2  7.32 | (for $C_{15}H_{18}O_3$) |

Preparation and effectiveness of insecticidal compositions in accordance with the present invention are illustrated below with reference to examples, in which the names of compounds are represented by the numbers of the compounds exemplified previously.

EXAMPLE 8

Each 0.2 part of the compoudns (2), (8), (9), (10) and (11) were individually dissolved in deodorized kerosene to make 100 parts, whereby 0.2 percent oil sprays were obtained.

The oil sprays thus obtained and 0.1 percent oil sprays of the said compounds were applied to female house fly adults according to mist-settling method [set forth in "Satchuzai Shishin (Guide to Insecticides)" edited by the Pharmacy Department of the Ministry of Health and Welfare, JAPAN] to calculate the number of knocked-down house flies with lapse of time as well as to observe the ratio of killed flies (mortality) after 24 hours. The results were as shown in the following table:

EXAMPLE 9

Using the compound (1), (6) and (7) individually as insecticidal ingredients, 0.6 percent mosquito coils were prepared according to ordinary procedures. The mosquito coils were subjected to insecticidal test using female northern house mosquito adults.

The test was effected according to the following procedures:

A glass cylinder of 20 cm. in inner diameter and 43 cm. in height was placed through the interposition of a disk of 27 cm. in diameter. Into the cylinder, 20 northern house mosquitoes were liberated, and the cylinder was covered at the top with the same disk as mentioned above. Each of the above-mentioned mosquito coils was ignited on one end, and when the burning state thereof had become normal, it was burned for 1 minute to count the number of knocked-down northern house mosquitoes with lapse of time. The results were as shown in the following table:

| Sample | Knock-down ratio with lapse of time (%) | | | | | | Mortality after 24 hours (%) |
|---|---|---|---|---|---|---|---|
| | 1 min. 40 sec. | 2 min. 39 sec. | 4 min. 11 sec. | 6 min. 38 sec. | 10 min. 31 sec. | 16 min. 40 sec. | |
| 0.1% Oil spray of compound (2) | 1.1 | 6.5 | 25.0 | 48.9 | 86.9 | 98.9 | 38.0 |
| 0.2% Oil spray of compound (2) | 1.1 | 22.8 | 55.4 | 82.6 | 93.5 | 100 | 66.3 |
| 0.1% Oil spray of compound (8) | 2.5 | 6.3 | 27.5 | 50.0 | 86.3 | 100 | 36.3 |
| 0.2% Oil spray of compound (8) | 3.8 | 23.8 | 57.5 | 81.3 | 96.3 | 100 | 70.0 |
| 0.1% Oil spray of compound (9) | 2.0 | 5.4 | 26.3 | 54.3 | 87.7 | 100 | 30.5 |
| 0.2% Oil spray of compound (9) | 3.4 | 20.6 | 53.8 | 86.1 | 98.0 | 100 | 76.8 |
| 0.1% Oil spray of compound (10) | 1.8 | 5.0 | 24.7 | 43.4 | 80.2 | 98 | 40.3 |
| 0.2% Oil spray of compound (10) | 2.9 | 18.7 | 40.9 | 78.3 | 91.4 | 100 | 81.5 |
| 0.1% Oil spray of compound (11) | 2.2 | 3.8 | 20.5 | 40.3 | 79.8 | 97 | 35.3 |
| 0.2% Oil spray of compound (11) | 4.9 | 21.1 | 41.3 | 64.4 | 97.3 | 100 | 72.4 |

| Sample | Knock-down ratio with lapse of time (%) | | | | | | | | |
|---|---|---|---|---|---|---|---|---|---|
| | 1 min 40 sec | 2 min 6 sec | 2 min 39 sec | 3 min 20 sec | 4 min 11 sec | 5 min 16 sec | 6 min 38 sec | 8 min 21 sec | 10 min 31 sec |
| 0.6% Mosquito coil of compound (1) | — | 3.0 | 16.0 | 27.0 | 56.0 | 77.0 | 95.0 | 99.0 | — |
| 0.6% Mosquito coil of compound (6) | 1.5 | 2.4 | 17.7 | 25.8 | 52.9 | 79.3 | 94.1 | 97.4 | 100 |
| 0.6% Mosquito coil of compound (7) | 1.3 | 2.5 | 16.3 | 25.0 | 53.8 | 78.8 | 96.3 | 98.8 | 100 |

EXAMPLE 10

Each 10 parts of the compounds (3) and (12) were individually mixed with 30 parts of Sorpol 22 (registered trade name for an emulsifier produced by Toho Kagaku K.K.) and 60 parts of xylene, in this order, and the mixtures were stirred to obtain emulsifiable concentrates. The thus obtained emulsifiable concentrates were individually diluted with water to 50 times, and the resulting emulsions were applied to female house fly adults according to mistsettling method set forth in "Satchuzai Shishin (Guide to Insecticides)" edited by the Pharmacy Department of the Ministry of Health and Welfare, JAPAN to calculate the number of knocked-down house flies with lapse of time as well as to observe the ratio of killed flies (mortality) after 24 hours. The results were as shown in the following table:

| Sample | Knock-down ratio with lapse of time (%) | | | | | | Mortality after 24 hours (%) |
|---|---|---|---|---|---|---|---|
| | 4 min. 11 sec. | 6 min. 38 sec. | 10 min. 31 sec. | 16 min. 40 sec. | 26 min. 25 sec. | 41 min. 52 sec. | |
| 50 Times-diluted emulsion of 10% emulsifieable concentrate of compound (3) | 7.1 | 15.1 | 38.4 | 70.7 | 93.9 | — | 60.6 |
| 50 Times-diluted emulsion of 10% emulsifiable concentrate of compound (12) | 3.8 | 20.0 | 41.3 | 68.8 | 92.5 | 100 | 63.8 |

EXAMPLE 11

Each 1 part of the compounds (1), (6), (13), (14) and (15) were individually dissolved in 20 parts of acetone. To each of the solutions was added 99 parts of 300 mesh diatom earth, and the resulting mixtures were thoroughly stirred in a mortar and were then freed from acetone by vaporization to obtain dusts.

In 1/50,000 Wagner pots were grown rice plants which had elapsed 45 days after sowing. The rice plants were dusted by use of a bell jar duster with each 300 mg/pot of the above-mentioned dusts and of a 1.5 percent dust of malathion, and each pot was covered with a wire net. Into the wire net, 30 adults of leafhoppers (Nephotettix cincticeps Uhles) were liberated, and the alive and dead of the insects were observed after 24 hours. The results were as shown in the following table:

| Sample (1.0% dust) | Mortality (%) |
|---|---|
| Dust of compound (1) | 100 |
| Dust of compound (6) | 100 |
| Dust of compound (13) | 100 |
| Dust of compound (14) | 100 |
| Dust of compound (14) | 100 |
| Dust of compound (15) | 100 |
| 1.5% Dust of malathion | 100 |

EXAMPLE 12

1 percent Oil sprays of various compounds of the present invention which had been obtained in the same manner as in Example 8 were individually sprayed in a proportion of 50 ml/m² onto the surface of a plywood. After air-drying the plywood surface, a glass link of 10 cm. in diameter having an inner wall surface coated with butter was placed on the plywood. Subsequently, 10 German cockroach adults were liberated in the glass link and were continuously contacted with the treated surface for 24 hours. Thereafter, the number of knocked down insects (including killed insects) was calculated to obtain the results shown in the following table:

| Insecticide (1% oil spray) | Knock-down ratio (%) |
|---|---|
| Compound (1) | 100 |
| do. (2) | 100 |
| do. (3) | 100 |
| do. (4) | 100 |
| do. (5) | 95 |

EXAMPLE 13

Into purified kerosene, 0.2 part of 2-methyl-5-propargyl-3-furylmethyl 2,2,3,3-tetramethylcyclopropane-1-carboxylate were dissolved, wherein purified kerosene was used in an amount which made the total amount of the solution 100 parts, thereby a 0.2 percent oil preparation was obtained.

EXAMPLE 14

Into purified kerosene, 0.2 part of 5-propargyl-3-furylmethyl 2,2,3,3-tetramethylcyclopropane-1-carboxylate were dissolved, wherein purified kerosene was used in an amount which made the total amount of the solution 100 parts, thereby a 0.2 percent oil preparation was obtained.

EXAMPLE 15

An emulsifiable concentrate was obtained from the following three compounds:

1. 10 Parts of 3-methoxy-5-(3-butynyl)-2-furylmethyl 2,2,3,3-tetramethylcyclopropane-1-carboxylate,
2. 30 Parts of Sorpol 22 (the registered trade name of a product of Toho Kagaku), and
3. 60 Parts of xylene.

The above three compounds were added, stirred, mixed and dissolved together, thereby an emulsifiable concentrate was obtained.

EXAMPLE 16

An emulsifiable concentrate was obtained from the following three compounds:

1. 10 Parts of 5-(3-butynyl)-2-furylmethyl 2,2,3,3-tetramethylcyclopropane-1-carboxylate,
2. 30 Parts of Sorpol 22 (the registered trade name of a product of Toho Kagaku), and
3. 60 Parts of xylene.

The above three compounds were added, stirred, mixed and dissolved together, thereby an emulsifiable concentrate was obtained.

EXAMPLE 17

With 97 g. of a mixture of diatomaceous earth and kaolin, 3 g. of 5-propargyl-3-furylmethyl 2,2,3,3-tetramethylcyclopropane-1-carboxylate was mixed and pulverized, thereby a 3 percent dust was obtained.

EXAMPLE 18

With 97 g. of a mixture of diatomaceous earth and kaolin, 3 g. of 3,4-dimethyl-5-(4-pentynyl)-2-furylmethyl 2,2,3,3-tetramethylcyclopropane-1-carboxylate was mixed and pulverized, thereby a 3 percent dust was obtained.

EXAMPLE 19

With 80 g. of a mixture of diatomaceous earth and kaolin, 15 g. of 5-propargyl-2-furylmethyl 2,2,3,3-tetramethylcyclopropane-1-carboxylate and 5 g. of a wetting agent were mixed and pulverized together, thereby a 15 percent wettable powder was obtained.

EXAMPLE 20

With 80 g. of a mixture of diatomaceous earth and kaolin, 15 g. of 3,4-dichloro-5-propargyl-2-furylmethyl 2,2,3,3-tetramethylcyclopropane-1-carboxylate and 5 g. of a wetting agent were mixed and pulverized together, thereby a 15 percent wettable powder was obtained.

EXAMPLE 21

Into purified kerosene, 0.3 g. of 4-methyl-5-propargyl-2-furylmethyl 2,2,3,3-tetramethylcyclopropane-1-carboxylate, 0.3 g. of allethrin and 15 g. of octachlorodipropyl ether were dissolved, wherein purified kerosene was used in an amount which made the total amount 100 ml. In an pressure-proof container, 90 ml. of the above-said 100 ml. of the solution was filled, thereafter 210 ml. of a mixture of dichlorodifluoromethane for use as a coolant, vinyl chloride and liquefied petroleum gas was charged in the said container as a propellant. A valve for injecting the content was then attached to the thus-filled container, thereby an aerosol was obtained.

EXAMPLE 22

Into purified kerosene, 0.3 g. of 5-(4-pentynyl)-2-furylmethyl 2,2,3,3-tetramethylcyclopropane-1-carboxylate, 0.3 g. of allethrin and 1.5 g. of octachlorodipropyl ether were dissolved, wherein purified kerosene was used in an amount which made the total amount 100 ml. In a pressure-proof container, 90 ml. of the above-stated 100 ml. of the solution was filled. Subsequently, 210 ml. of a mixture of dichlorofluoromethane for use as a coolant, vinyl chloride and liquefied petroleum gas was charged in the said container as a propellant. Thereafter, a valve for injecting the content was attached to the container, thereby an aerosol was obtained.

EXAMPLE 23

With 99.3 g. of mosquito coil base materials such as pyrethrum marc, wood powder, starch and the like, 0.7 g. of 5-ethynyl-2-furylmethyl 2,2,3,3-tetramethylcyclopropane-1-carboxylate was uniformly mixed. Thereafter, according to publicly-known procedures, a mosquito coil containing 7 percent of active ingredients was obtained.

EXAMPLE 24

With 99.3 g. of mosquito coil base material such as residues of pyrethrum marc, wood powder, starch and the like, 0.7 g. of 3-methyl-5-propargyl-2-furylmethyl 2,2,3,3-tetramethylcyclopropane-1-carboxylate was mixed uniformly. Thereafter, according to publicly-known procedures, a mosquito coil containing 0.7 percent of active ingredients was obtained.

EXAMPLE 25

From 0.3 g. of allethrin, 0.4 g. of 5-(3-butynyl)-2-furylmethyl 2,2,3,3-tetramethylcyclopropane-1-carboxylate and 99.3 g. of mosquito coil base materials, a mosquito coil was prepared.

EXAMPLE 26

From 0.3 g. of allethrin, 0.4 g. of 2-chloro-5-propargyl-3-furylmethyl 2,2,3,3-tetramethylcyclopropane-1-carboxylate and 99.3 g. of mosquito coil base materials, a mosquito coil was prepared.

We claim:
1. 5-Propargyl-2-furylmethyl 2,2,3,3-tetramethylcyclopropane-1-carboxylate.
2. 5-(3-Butynyl)-2-furylmethyl 2,2,3,3-tetramethylcyclopropane-1-carboxylate.
3. 5-(4-Pentynyl)-2-furylmethyl 2,2,3,3-tetramethylcyclopropane-1-carboxylate.
4. 5-Ethynyl-2-furylmethyl 2,2,3,3-tetramethylcyclopropane-1-carboxylate.
5. 3-Methyl-5-propargyl-2-furylmethyl 2,2,3,3-tetramethylcyclopropane-1-carboxylate.
6. 4-Methyl-5-propargyl-2-furylmethyl 2,2,3,3-tetramethylcyclopropane-1-carboxylate.
7. 3-Methoxy-5-(3-butynyl-2-furylmethyl 2,2,3,3-tetramethylcyclopropane-1-carboxylate.
8. 3,4-Dichloro-5-propargyl-2-furylmethyl 2,2,3,3-tetramethylcyclopropane-1-carboxylate.

* * * * *